United States Patent
Grandbois

(12) 
(10) Patent No.: US 6,188,835 B1
(45) Date of Patent: *Feb. 13, 2001

(54) OPTICAL DISK SYSTEM AND METHOD FOR STORING DATA ALLOWING PLAYBACK OF SELECTED PORTIONS OF RECORDED PRESENTATIONS

(75) Inventor: Brett J. Grandbois, Fremont, CA (US)

(73) Assignee: LSI Logic Corporation, Milpitas, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/286,177

(22) Filed: Apr. 5, 1999

Related U.S. Application Data

(60) Provisional application No. 60/097,368, filed on Aug. 21, 1998.

(51) Int. Cl.[7] ................................................ H04N 5/781
(52) U.S. Cl. .............................. 386/126; 386/95; 386/111
(58) Field of Search .................................... 386/125, 126, 386/45, 95, 124, 121, 106, 105, 109, 108, 111; 360/69, 78.04; 707/4; 711/103

(56) References Cited

U.S. PATENT DOCUMENTS

| | | | |
|---|---|---|---|
| 5,446,714 | * | 8/1995 | Yoshio et al. ........................ 386/106 |
| 5,907,658 | * | 5/1999 | Murase et al. ....................... 386/125 |
| 5,907,659 | * | 5/1999 | Yamauchi et al. ................... 386/125 |
| 5,926,810 | * | 6/1999 | Noble et al. ............................. 707/4 |
| 5,926,826 | * | 7/1999 | Ninomiya et al. ................... 711/103 |

* cited by examiner

Primary Examiner—Thai Tran

(57) ABSTRACT

An optical disk system is presented which stores index information allowing playback of selected portions of a presentation recorded upon an optical disk, along with an associated method. The index information includes navigation data indicating the physical location of a beginning of a selected portion of a presentation stored upon the optical disk. One embodiment of the optical disk system includes a memory unit operably coupled to a disk drive unit and an input device. The disk drive unit retrieves identification data, encoded video data, and navigation data stored upon an optical disk (e.g., a DVD). The encoded video data may be, for example, a recorded presentation such as a movie. The input device produces an output signal in response to user input, wherein the output signal indicates a beginning of a selected portion of the encoded video data. The memory unit includes a non-volatile portion for storing the identification data and the index information. The index information may be retrieved from the memory unit at a later time. The optical disk system also automatically accesses the selected portion of the encoded video data indicated by the retrieved index information, eliminating the need for manual access by the user. The optical disk system thus allows the user to experience previously selected portions of a presentation (e.g., favorite movie scenes) with minimum effort and without having to view the entire presentation from beginning to end.

19 Claims, 2 Drawing Sheets

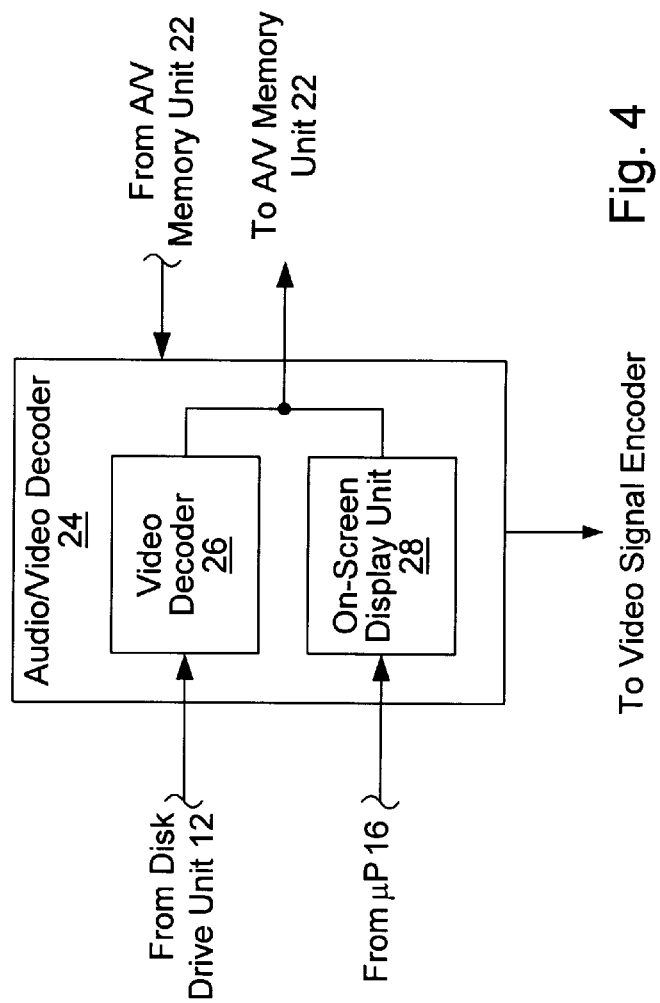

US 6,188,835 B1

OPTICAL DISK SYSTEM AND METHOD FOR STORING DATA ALLOWING PLAYBACK OF SELECTED PORTIONS OF RECORDED PRESENTATIONS

This application claims the benefit of Provisional No. 60/097,368 filed Aug. 21, 1998.

BACKGROUND OF THE INVENTION

1. Field of the Invention

This invention relates to optical disk systems, and in particular to optical disk systems for playing back recorded presentations (e.g., viewing movies).

2. Description of the Related Art

Optical disks are recording media typically containing long strings of microscopic pits representing digitally encoded data. Each string of pits is called a "track". The tracks are formed end to end in a spiral pattern around the center of one or both major surfaces of the disk. Reflected laser light is used to "read" the data encoded in the pits. Common types of optical disks available today include compact disks (CDs), laser video disks, and digital versatile disks (DVDs). Various optical disk players are available which read data from optical disks.

The current DVD standard is a compromise format agreed upon by several major consumer electronic and entertainment companies. Under the current DVD standard, the capacity of a single side, single layer DVD with a diameter of 4.7 inches is 4.7 gigabytes, enough to store about 135 minutes of video data. This capacity is sufficient for about 95% of all full length movies. The current DVD standard also provides for up to eight different sound tracks in different languages, each with up to eight different audio channels to create a three-dimensional acoustic effect. In addition, up to 32 different sets of subtitles (i.e., translation text) may be stored on a DVD for display during playback.

Many users have favorite movie scenes, and like having the ability to view those scenes without having to view the entire movie. With a linear recording media like video tape, accessing a particular scene may involve determining the distance from the beginning of the tape to the start of the section of the tape where the scene is stored. The distance may be measure in inches, for example, and a counter having a visual display may be used to measure the length of tape passing between two rollers.

In order to view a particular favorite scene, a video tape system user may reset (i.e., "zero") the counter at the beginning the tape, allow the tape to advance to the beginning of the scene, then write down (i.e., record) the value displayed by the counter. In order to view the scene at a later date, the user may again reset the counter at the beginning of the tape, advance the tape at an accelerated rate (e.g. "fast forward" the tape) until the displayed value matches the recorded value, then replay the favorite scene.

A user's written record of counter values (i.e., list of indices) corresponding to beginnings of favorite scenes is subject to loss. In addition, the user must manually access the sections of recording media containing the favorite scenes. It would thus be beneficial to have an optical disk system which embodies a method for storing indices corresponding to selected portions of recorded presentations. The desired system would store the locations of the beginnings of the selected portions of the presentations (e.g., indices to favorite scenes) for multiple optical disks (e.g., DVDs). Further, the locations of the beginnings of the selected portions of the presentations would be accessible by a control mechanism of the optical disk system. The control mechanism would automatically access and begin playback at the selected portion of a particular presentation. Such a system would allow a user to conveniently keep a record of and access selected portions of multiple presentations (e.g., favorite scenes in several different movies).

SUMMARY OF THE INVENTION

The problems outlined above are in large part solved by an optical disk system and method for storing index information indicating the beginnings of selected portions of presentations recorded upon an optical disk. One embodiment of the optical disk system includes a memory unit operably coupled to a disk drive unit and an input device. The disk drive unit retrieves identification data, encoded video data, and navigation data stored upon an optical disk (e.g., a DVD). The encoded video data may be, for example, a recorded presentation such as a movie.

The input device may include a keypad having multiple electrical pushbutton switches or "keys". A user may cause the input device to produce the output signal by pressing one or more of the keys of the keypad. The occurrence of the output signal may indicate the beginning of a selected portion of the encoded video data (i.e., presentation). When the output signal is received from the input device, the current navigation data identifies the physical location of the beginning of the selected portion of the presentation on the optical disk. The current navigation data is stored within the memory unit. The stored navigation data is later retrieved and used to locate the encoded video data corresponding to the selected portion of the presentation. Retrieval of the stored navigation data corresponding to the selected portion of the presentation allows replay of only the selected portion of the presentation (e.g., a favorite movie scene).

The memory unit includes a non-volatile portion for storing the identification data and the current navigation data. The non-volatile portion of the memory unit may include, for example, flash memory or electrically erasable programmable random access memory (EEPROM) which maintains stored contents even in the absence of applied electrical power.

The data stored within the memory unit may include identification data and index information, wherein the index information includes a navigation data portion and a time index portion. The identification data may include a portion of a textual title of the optical disk. A value corresponding to the identification data may be stored within the non-volatile portion of the microprocessor memory unit in order to minimize storage requirements. The value may be, for example, an error detection code (e.g., checksum) computed from the identification data stored upon the optical disk.

The navigation data portion identifies the physical location of the beginning of the selected portion of the presentation on the optical disk as describe above. The time index may be a length of time from the beginning of the presentation in an 'hour:minute:second' format, wherein the hour entry is a pair of decimal digits between '00' and '99', and the minute and second entries are pairs of decimal digits between '00' and '59'. The time index may be displayed upon a display screen of a display device in order to allow a user to select between several selected portions of the same presentation.

The optical disk system may also include a microprocessor coupled between the disk drive unit and the memory unit, and operably coupled to the input device. The microprocessor receives the identification data and the navigation data from the disk drive unit and the output signal produced by the input device. Operational modes of the microprocessor may include a "save index" mode and a "play index" mode. When the microprocessor is placed in the save index mode (e.g., via the input device), the microprocessor responds to the output signal by: (i) producing the index information, and (ii) storing the identification data and the index information within the non-volatile portion of the memory unit.

The microprocessor may include a timekeeping circuit which keeps track of a length of playback time from the beginning of a presentation. When the microprocessor is in the save index mode, the time index may correspond to the value stored within a register of the timekeeping circuit when the microprocessor receives the output signal. For example, after enabling the save index operating mode, pressing any key on the keypad of the input device may signal the beginning of a favorite scene of a movie. In response to the output signal, the microprocessor produces the index information and stores the identification data and the index information within the non-volatile portion of the memory unit.

When the microprocessor is in the play index mode, the microprocessor responds to the output signal by: (i) retrieving the index information from the non-volatile portion of the memory unit, and (ii) producing a control signal coupled to the disk drive unit which causes the disk drive unit to retrieve encoded video data corresponding to navigation data portion of the index information. As described above, the navigation data portion corresponds to the beginning of the selected portion of the encoded video data. Thus the optical disk system automatically accesses the selected portion of the presentation indicated by the index information.

The optical disk system may also include an audio/video decoder coupled to the disk drive unit. The audio/video decoder may include a video decoder and an on-screen display unit. The video decoder may receive the encoded video data from the disk drive and decode the encoded video data, thereby producing decoded video data. The on-screen display unit may receive the identification data and index information from the microprocessor and produce image data including the identification data and a portion of the index information (e.g., the time index portion). The image data may be superimposed upon the decoded video data in order to create a menu listing index information display options available to the user.

A method for playing back a selected portion of a presentation recorded upon an optical disk includes providing the optical disk system described above. The identification data is obtained from the optical disk. The obtaining may be performed when the optical disk is inserted into the disk drive unit, and may be carried out by using the disk drive unit to scan the optical disk to obtain the identification data. In response to a first occurrence of the output signal: (i) index information is produced corresponding to a beginning of the selected portion of the presentation; and (ii) the identification data and the index information are stored within the non-volatile portion of the memory unit. The index information may include the time index and navigation data portions described above.

The method may also include retrieving the identification data and the index information from the non-volatile portion of the memory unit, and initiating retrieval of encoded video data by the disk drive unit at a playback point corresponding to the beginning of the selected portion of the encoded video data as indicated by the index information. The retrieving and initiating are performed following the storing, and may be performed when the microprocessor is in the play index mode. Thus the retrieving and initiating may be prompted by an output signal produced by the input device subsequent to the output signal which initiated the storing of the index information.

BRIEF DESCRIPTION OF THE DRAWINGS

Other objects and advantages of the invention will become apparent upon reading the following detailed description and upon reference to the accompanying drawings in which:

FIG. 3 is a block diagram of one embodiment of a table of index information stored within the non-volatile portion of the microprocessor memory unit of FIG. 2; and FIG. 4 is a block diagram of one embodiment of an audio/video decoder of the optical disk system of FIG. 1.

Figure 1:
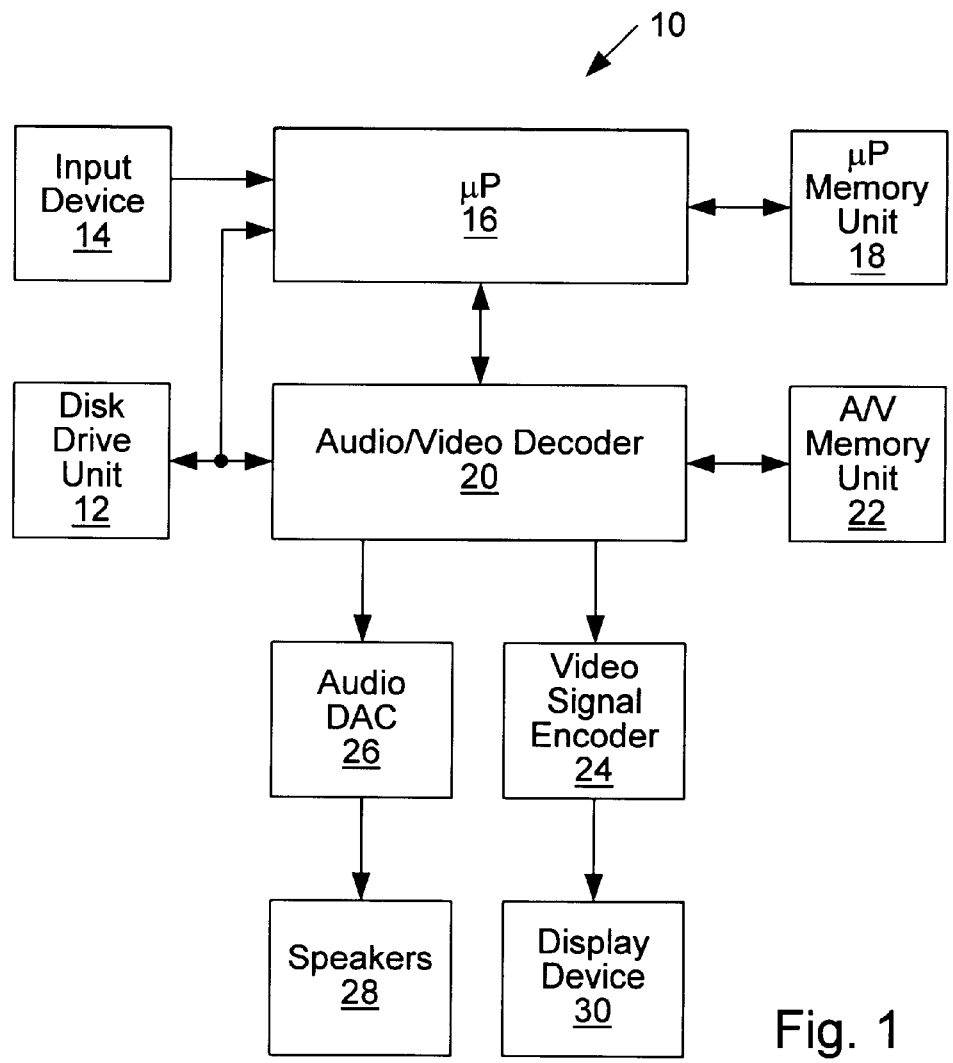
FIG. 1 is a block diagram of one embodiment of an optical disk system in accordance with the present invention, wherein the optical disk system includes a microprocessor memory unit having a non-volatile portion for storing index information corresponding to the beginnings of selected portions of encoded video data stored upon the optical disk.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring to the drawings, FIG. 1 is a block diagram of one embodiment of an optical disk system 10 in accordance with the present invention. Optical disk system 10 includes a disk drive unit 12 for retrieving identification data, encoded video and audio data, and navigation data stored upon an optical disk. The optical disk may be, for example, a DVD. The optical disk may be placed within a designated area of a horizontal platform which slides in and out of disk drive unit 12. Alternately, disk drive unit 12 may have a slot for insertion of the optical disk.

The identification data stored upon the optical disk is used to identify the disk and may include a textual title. Alternately, when the optical disk is a DVD, each of the two sides of the optical disk is called a volume and has a primary volume descriptor. The primary volume descriptor includes several fields which could be used alone or in combination as identification data to identify the disk: (1) system identifier, 32 bytes; (2) volume identifier, 32 bytes; (3) volume set identifier, 128 bytes; (4) publisher identifier, 128 bytes; (5) copyright identifier, 37 bytes; and (6) volume creation date and time, 17 bytes.

The encoded video data stored upon the optical disk may be, for example, digital video data compressed and encoded according to a Moving Pictures Experts Group (MPEG) standard (e.g., MPEG-2). The encoded audio data may be, for example, digital audio data compressed and encoded according to the Dolby® AC-3™ or MPEG-2 audio standard. The encoded video data may be a recorded presentation such as a movie.

Optical disk system 10 also includes an input device 14 for producing an output signal in response to user input. The output signal may be used to convey user settings or select between operating modes. User settings may include, for example, spoken language, video display format, audio volume setting, and subtitle language. The output signal may also be used to indicate the beginning of a selected portion of the encoded video data (e.g., a favorite movie scene). Input device 14 may include a keypad having multiple electrical pushbutton switches or "keys". A user may cause input device 14 to produce the output signal by pressing one or more of the keys of the keypad.

Optical disk system 10 also includes a microprocessor 16 coupled to receive the identification data and navigation data from disk drive unit 12 as well as the output signal produced by input device 14. Input device 14 may be a "remote" control unit in wireless communication with microprocessor 16 (e.g., via an infrared light beam). Microprocessor 16 is coupled to a microprocessor memory unit 18, and executes instructions stored within microprocessor memory unit 18 in order to control other functional units of optical disk system 10.

Microprocessor 16 may also include a timekeeping circuit which keeps track of a length of time from the beginning of a presentation (i.e., a time index). The time index may stored and/or displayed in an 'hour:minute:second' format. When the optical disk is a DVD, the timekeeping circuit preferably keeps track of playback time by updating the contents of a register using the playback hour, minute, and second information provided by the navigation data. In the case of a video CD optical disk, the time index may stored and/or displayed in an 'minute:second:frame' format, and the time index may indicate the physical location of the presentation data upon the optical disk.

As will be described in detail below, microprocessor 16 stores the identification data of an optical disk in disk drive unit 12, along with index information corresponding to a beginning of the selected portion of the encoded video data (e.g., presentation), within a non-volatile portion of microprocessor memory unit 18. The index information includes navigation data which indicates the physical location of the beginning of the selected portion of the presentation stored upon the optical disk.

Each time an optical disk is inserted into disk drive unit 12, microprocessor 16 may search microprocessor memory unit 18 for index information associated with the disk. If index information associated with the disk is found, the user may be given the option of viewing the entire presentation or selecting from one or more previously selected portions of the presentation. When a user chooses a previously selected portion of the presentation for playback, optical disk system 10 may use the index information to access the encoded video data and automatically playback the selected portion. This represents a very convenient way for the user to experience previously selected portions of the presentation.

Optical disk system 10 also includes an audio/video decoder 20 coupled to disk drive unit 12 and microprocessor 16. Audio/video decoder 20 receives the encoded video and audio data from disk drive unit 12 along with the identification data and the index information from microprocessor 16. Audio/video decoder 20 decodes the encoded video and audio data thereby producing decoded video and audio data. When a portion of the index information is to be displayed, audio/video decoder 20 stores the decoded video and audio data, the identification data, and the portion of the index information within an audio/video (A/V) memory unit 22 coupled to audio/video decoder 20.

In order to display the portion of the index information for user selection, audio/video decoder 20 subsequently retrieves the decoded video data and image data including the identification data and the index information from audio/video (A/V) memory unit 22. Audio/video decoder 20 produces an output signal which is a combination of the decoded video data, the identification data, and the portion of the index information, and provides the output signal to a video signal encoder 24 coupled to audio/video decoder 20. For example, the output signal may result in one or more menus being displayed upon a display device of optical disk system 10. Each menu may contain the image data superimposed upon decoded video data. Audio/video decoder 20 also retrieves decoded audio data from audio/video memory unit 22, synchronizes the decoded video and audio data, and provides the audio data to an audio DAC 26 coupled to audio/video decoder 20.

Optical disk system 10 also includes two or more speakers 28 coupled to audio DAC 26 and a display device 30 coupled to video signal encoder 24. Audio DAC 26 receives digital audio data produced by audio/video decoder 20 and produces an analog audio signal from the digital audio data. The analog audio signal is coupled to speakers 28. Speakers 28 convert the electrical energy of the analog audio signal into sound energy. Display device 30 may be, for example, a television. Video signal encoder 24 receives the output signal produced by audio/video decoder 20 and produces an analog video signal, preferably according to a recognized standard television broadcast format (e.g., national television system committee or NTSC, phase alternate line or PAL, etc.). The analog video signal is coupled to display device 30. Display device 30 has a display screen and creates an image upon the display screen, wherein the image is dependent upon the analog video signal.

The encoded video and audio data of a DVD is organized into cells associated with multiple pictures or frames. A program is a group of cells, and a program chain is a collection of programs. The navigation data on a DVD controls playback of the presentation data. Each volume of a DVD may have one or more titles, wherein each title is used to designate a particular grouping of presentation data (e.g., a movie, etc.). A Part_of_Title is a navigation data construct which includes pointers or links to one or more program chains. The term "chapter" refers to the Part_of_Title construct. A title on a DVD may have multiple program chains labeled as, for example, "chapter 5." These program chains may include different cells depending on, for example, selected camera angle and parental guidance. Although more information is required to designate a specific playback point, the term "chapter" may be used to designate a specific playback point when interfacing with the user. The navigation data may also include the hour, minute, and second of playback time.

Figure 2:
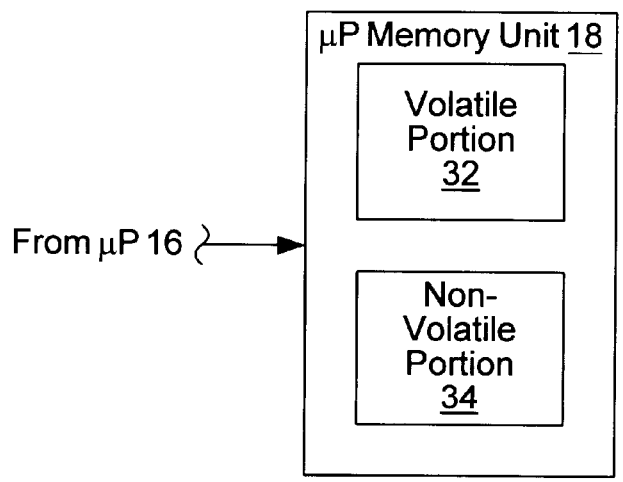
FIG. 2 is a block diagram of one embodiment of the microprocessor memory unit of FIG. 1.

FIG. 2 is a block diagram of one embodiment of microprocessor memory unit 18. Microprocessor memory unit 18 includes a volatile portion 32 and a non-volatile portion 34. Volatile portion 32 may include, for example, static random access memory (SRAM) which requires an uninterrupted supply of electrical power in order to maintain stored contents. Non-volatile portion 34 may include, for example, flash memory or electrically erasable programmable random access memory (EEPROM) which maintains stored contents even in the absence of applied electrical power.

FIG. 3 is a block diagram of one embodiment of a table 36 of index information stored within non-volatile portion 34 of microprocessor memory unit 18 and maintained by microprocessor 16. Table 36 includes multiple entry locations, and each entry location is configured to store information pertaining to a particular optical disk. Each entry location includes a disk identification field and five index information fields. The disk identification field may include, for example, an entire textual title, a portion of a textual title, or a numeric value. Each index information field may contain navigation data and a time index corresponding to the beginning of a selected portion of a presentation recorded upon the optical disk.

At one byte per character, a textual title of a disk, or even a portion of the title, may be tens of bytes in length. A numeric value may be substituted for the title, or portion thereof, in order to reduce memory storage requirements. The numeric value may be, for example, an error detection code computed upon the disk identification data. A checksum is an example of such an error detection code. A checksum may be computed by adding the contents of one or more of the fields of the primary volume descriptor of the optical disk, then performing a modulus operation upon the data. Using the above checksum calculation method to determine the contents of a 32-bit (4-byte) identification field, the odds of two different optical disks having identical checksums is about 1 in 4,300,000,000.

Each index information field includes navigation data identifying the physical location of encoded video data corresponding to the beginning of a particular selected portion of the presentation (i.e., selected playback location). The saving of a selected playback location for a DVD may require saving the following location information about the physical stop point: (1) the logical block address (LBA) of the navigation data associated with the playback location (i.e., the LBA of the associated navigation pack or "nav-pack"), (2) the video title set (VTS) number, (3) the program chain (PGC) number, and (4) the cell number. Other useful information which may also be saved include the video object (VOB) number, the video object unit (VOBU) number, the video object set (VOBS) number, and the program (PG) number.

Each information field may also include a playback time index indicating the length of time from a beginning of the presentation to the corresponding selected playback location. The time index may be used to allow user selection between multiple selected playback locations of a single presentation. As described above, the time index may be in an 'hour:minute:second' format for display and user selection. Each hour entry may be two decimal digits ranging from '00' to '99', and each minute and second entry may be two decimal digits ranging from '00' to '59'.

When an optical disk is inserted into disk drive unit 12, microprocessor 16 may receive the disk identification data (e.g., textual title) from disk drive unit 12. Microprocessor 16 may then search table 36 within non-volatile portion 34 of microprocessor memory unit 18 for an entry with matching identification data in the disk identification field. If an entry with matching disk identification data is found in table 36, microprocessor 16 may, for example, cause a message similar to the following to be displayed:

"Playback entire presentation or selected portion?
1. Entire presentation
2. Selected portion"

If the user indicates a desire to playback the entire presentation (i.e., if the user presses a key labeled "1" on the numeric keypad of input device 14), microprocessor 16 may initiate playback of the presentation from the beginning.

If, on the other hand, the user indicates a desire to playback only a selected portion of the presentation, a "play index" operating mode of microprocessor 16 may be enabled. In the play index operating mode, microprocessor 16 may access table 36 and print portions of the contents of valid (i.e., non-empty) index information fields for user selection:

"Select one of the following:
1. 00:25:16
2. 00:58:12
3. 01:46:50
4. (More)
5. (Cancel)"

If the user makes a selection corresponding to a displayed portion of an index information field (e.g., the time index portion), microprocessor 16 may send a control signal to disk drive unit 12 which causes disk drive unit 12 to initiate retrieval of encoded video and audio data from the optical disk at the playback point indicated by the navigation data stored within the index information field.

FIG. 4 is a block diagram of one embodiment of audio/video decoder 24. Audio/video decoder 24 includes a video decoder 26 and an on-screen display (OSD) unit 28. Video decoder 26 receives the encoded video and audio data from disk drive unit 12, and on-screen display unit 28 receives the identification data and a portion of the index information from microprocessor 16. Video decoder 26 decodes the encoded video data thereby producing decoded video data. Video decoder 26 stores the decoded video data within audio/video memory unit 22. On-screen display unit 28 may, for example, produce image data (e.g., bit-mapped textual characters) pertaining to the identification data and the portion of the index information, and store the image data within audio/video memory unit 22.

Audio/video memory unit 22 may include, for example, a frame buffer portion and an audio buffer portion. Video decoder 26 may store the decoded video data in the frame buffer portion. Audio/video decoder 24 may store decoded audio data in the audio buffer portion. On-screen display unit 28 may store image data pertaining to the identification data and the portion of the index information within the frame buffer portion such that the image data overwrites the decoded video data stored within the frame buffer portion video decoder 26. In this fashion, the image data produced by on-screen display unit 28 is superimposed upon the decoded video data. Audio/video decoder 24 may retrieve video data from the frame buffer portion, retrieve audio data from the audio buffer portion, synchronize the video and audio data, provide the video data to video signal encoder 24, and provide the audio data to audio DAC 26.

Alternately, the frame buffer portion of audio/video memory unit 22 may include a decoded video portion and an on-screen display portion. Video decoder 26 may store decoded video data in the decoded video portion of the frame buffer portion, and on-screen display unit 28 may store produced image data within the on-screen display portion of the frame buffer portion. Audio/video decoder 24 may retrieve video data from both the decoded video portion and the on-screen display portion of the frame buffer portion, superimpose the image data from the on-screen display portion upon the video data from the decoded video portion, and provide the resultant video data as an output signal to video signal encoder 24.

When the optical disk is a DVD, saving a selected playback location may require saving information about the physical data structure of the disk and the presentation data structure. The physical data structure includes the basic video and audio data, while the presentation data structure includes information about how the video and audio data should be played. For example, A DVD optical disk may include only a single title and a physical data structure including the basic video and audio data. However, the presentation data structure may contain several programs which replay different sequences of the video and audio data to reflect different camera angles, different chapter orderings, or the skipping of certain chapters based upon the parental management setting. More information about how data is organized upon a DVD may be obtained from *DVD Demystified* by Jim Taylor (1998, McGraw-Hill, Inc., New York, ISBN 0-07-064841-7).

A method for playing back a selected portion of a presentation recorded upon an optical disk using optical disk system 10 includes obtaining identification data from the optical disk. The identification data may be obtained by scanning the optical disk using disk drive unit 12 when the optical disk is inserted into disk drive unit 12. As described above, the identification data may be a portion of a title of the optical disk.

Index information may be stored within table 36 by enabling a "save index" operating mode of microprocessor 16. When the save index operating mode is enabled (e.g., via input device 14), the output signal from input device 14 may indicate the beginning of a selected portion of the encoded video data (i.e., the presentation). For example, after enabling the save index operating mode, pressing any key on the keypad of input device 14 may signal the beginning of a favorite scene of a movie. The time index portion of the index information may include the value of a register within the timekeeping circuit of microprocessor 16 when microprocessor 16 receives the output signal. The navigation data portion of the index information may include the existing navigation data when microprocessor 16 receives the output signal. When the output signal is received, microprocessor 16 produces the index information and stores the index information within non-volatile portion 34 of microprocessor memory unit 18.

Microprocessor 16 accomplishes the storing of index information by first searching table 36 in non-volatile portion 34 for an entry having a disk identification field with contents matching the identification data of the optical disk in disk drive unit 12. If such an entry is found, the index information may be stored in the first non-empty index information field of the entry. If all index information fields are filled, a replacement strategy may be implemented to overwrite the contents of one of the index information fields with the index information.

If an entry having a disk identification field with contents matching the identification data of the optical disk in disk drive unit 12 is not found, the disk identification data and index information may be stored in the first non-empty entry of table 36. If all entries in table 36 are filled, a replacement strategy may be implemented to erase the contents of (i.e., "clear") one of the entries and store the disk identification data and the index information in the cleared entry.

Numerous variations and modifications will become apparent to those skilled in the art once the above disclosure is fully appreciated. It is intended that the following claims be interpreted to embrace all such variations and modifications.

What is claimed is:

1. An optical disk system, comprising:
   a disk drive unit for retrieving identification data, encoded video data, and navigation data stored upon an optical disk;
   an input device for receiving user input and producing an output signal, wherein the output signal indicates a beginning of a selected portion of the encoded video data;
   a memory unit comprising a non-volatile portion for storing the identification data and navigation data; and
   a control unit coupled to receive the identification data and the navigation data from the disk drive unit and the output signal produced by the input device, wherein the control unit is coupled to the memory unit, and wherein the control unit responds to the output signal by:
   producing the current navigation data, wherein the current navigation data is the navigation data received from the disk drive unit when the output signal is received; and
   storing the identification data and the current navigation data within the non-volatile portion of the memory unit.

2. The optical disk system as recited in claim 1, wherein the optical disk is a DVD.

3. The optical disk system as recited in claim 1, wherein the identification data comprises a portion of a textual title of the optical disk.

4. The optical disk system as recited in claim 1, wherein the encoded video data comprises a presentation.

5. The optical disk system as recited in claim 4, wherein the input device includes a plurality of electrical pushbutton switches, and wherein when a user presses at least one of the electrical pushbutton switches, the optical disk system stores the identification data and the navigation data corresponding to the beginning of the selected portion of the encoded video data within the memory unit.

6. The optical disk system as recited in claim 1, wherein the non-volatile portion of the memory unit comprises flash memory.

7. The optical disk system as recited in claim 1, wherein the encoded video data comprises a movie, and wherein the selected portion of the encoded video data comprises a favorite scene in the movie.

8. An optical disk system, comprising:
   a disk drive unit for retrieving identification data, encoded video data, and navigation data stored upon an optical disk;
   an input device for producing an output signal in response to user input, wherein the output signal indicates a beginning of a selected portion of the encoded video data;
   a memory unit having a non-volatile portion for storing the identification data and navigation data;
   a microprocessor coupled to receive the identification data and the navigation data from the disk drive unit and the output signal produced by the input device, wherein the microprocessor is coupled to the memory unit, and wherein the microprocessor operates in a save index mode and a play index mode, and wherein when the microprocessor is in the save index mode, the microprocessor responds to the output signal by:
   producing the current navigation data, wherein the current navigation data is the navigation data received from the disk drive unit when the output signal is received, and wherein the current navigation data corresponds to the beginning of the selected portion of the encoded video data; and storing the identification data and the current navigation data within the non-volatile portion of the memory unit.

9. The optical disk system as recited in claim 8, wherein when the microprocessor is in the play index mode, the microprocessor responds to the output signal by:
   retrieving the navigation data from the non-volatile portion of the memory unit; and
   producing a control signal coupled to the disk drive unit which causes the disk drive unit to retrieve encoded video data corresponding to the navigation data.

10. The optical disk system as recited in claim 9, wherein the navigation data corresponds to the beginning of the selected portion of the encoded video data.

11. A method for playing back a selected portion of a presentation recorded upon an optical disk, comprising:
   providing an optical disk system comprising:
      a disk drive unit for retrieving data stored upon an optical disk;
      an input device for producing an output signal in response to user input; and
      a memory unit having a non-volatile portion;
   obtaining identification data from the optical disk;
   acquiring navigation data from the optical disk during playback of the presentation;
   receiving the output signal; and
   responding to the output signal by storing the identification data and the current navigation data within the non-volatile portion of the memory unit, wherein the current navigation data is the navigation data acquired when the output signal is received, and wherein the current navigation data corresponds to a beginning of the selected portion of the presentation.

12. The method as recited in claim 11, wherein the identification data is obtained from the optical disk when the optical disk is inserted into the disk drive unit.

13. The method as recited in claim 11, wherein the obtaining of the identification data comprises using the disk drive unit to scan the optical disk to obtain the identification data.

14. The method as recited in claim 11, wherein the acquiring is performed in response to the output signal from the input device.

15. A method for playing back a selected portion of a presentation recorded upon an optical disk, comprising:
   providing an optical disk system comprising:
      a disk drive unit for retrieving data stored upon an optical disk;
      an input device for producing an output signal in response to user input; and
      a memory unit having a non-volatile portion;
   obtaining identification data from the optical disk;
   receiving navigation data from the optical disk during playback of the presentation;
   receiving the output signal; and
   performing the following in response to a first occurrence of the output signal:
      producing current navigation data, wherein the current navigation data is the navigation data received when the output signal is received and wherein the current navigation data corresponds to a beginning of the selected portion of the presentation; and
      storing the identification data and the current navigation data within the non-volatile portion of the memory unit.

16. The method as recited in claim 15, further comprising:
   retrieving the identification data and the navigation data from the non-volatile portion of the memory unit; and
   initiating playback of the presentation at a playback point indicated by the navigation data.

17. The method as recited in claim 16, wherein the optical disk comprises encoded video data, and wherein the initiating comprises initiating retrieval of the encoded video data by the disk drive unit at the playback point.

18. The method as recited in claim 16, wherein the retrieving and the initiating are accomplished following the storing.

19. The method as recited in claim 16, wherein the retrieving and the initiating are performed in response to an occurrence of the output signal subsequent to the first occurrence.

* * * * *

UNITED STATES PATENT AND TRADEMARK OFFICE
CERTIFICATE OF CORRECTION

PATENT NO. : 6,188,835 B1
APPLICATION NO. : 09/286177
DATED : February 13, 2001
INVENTOR(S) : Brett J. Grandbois It is certified that error appears in the above-identified patent and that said Letters Patent is hereby corrected as shown below:

Replace Column 10 line 1 through column 12 line 42 with:

What is claimed is:
1. An optical disk system, comprising:
a disk drive unit for retrieving identification data, encoded video data, and navigation data from an optical disk positioned therein, wherein the identification data of the optical disk identifies the optical disk, and wherein the encoded video data comprises a presentation;
an input device configured to produce an output signal in response to user input, wherein the output signal indicates user selection of a portion of the presentation and occurs when a beginning of the user selected portion is currently being played;
a memory unit comprising a non-volatile portion; and
a control unit coupled to receive the identification data and the navigation data from the disk drive unit and the output signal produced by the input device, wherein the control unit is coupled to the memory unit, and wherein the control unit is configured to respond to the output signal by:
producing the current navigation data, wherein the current navigation data identifies the beginning of the user selected portion of the presentation currently being played; and
storing the identification data and the current navigation data within the non-volatile portion of the memory unit such that: (i) the identification data and the current navigation data exist in the non-volatile portion of the memory unit concurrently, and (ii) the current navigation data is associated with the identification data within the non-volatile portion of the memory unit.

2. The optical disk system as recited in claim 1, wherein the optical disk is a DVD.

3. The optical disk system as recited in claim 1, wherein the identification data comprises a portion of a textual title of the optical disk.

4. The optical disk system as recited in claim 1, wherein the encoded video data comprises a presentation.

UNITED STATES PATENT AND TRADEMARK OFFICE
CERTIFICATE OF CORRECTION

| | | |
|---|---|---|
| PATENT NO. | : 6,188,835 B1 | |
| APPLICATION NO. | : 09/286177 | |
| DATED | : February 13, 2001 | |
| INVENTOR(S) | : Brett J. Grandbois | |

It is certified that error appears in the above-identified patent and that said Letters Patent is hereby corrected as shown below:

5. The optical disk system as recited in claim 4, wherein the input device includes a plurality of electrical pushbutton switches, and wherein when a user presses at least one of the electrical pushbutton switches, the optical disk system stores the identification data and the navigation data corresponding to the beginning of the selected portion of the encoded video data within the memory unit.

6. The optical disk system as recited in claim 1, wherein the non-volatile portion of the memory unit comprises flash memory.

7. The optical disk system as recited in claim 1, wherein the encoded video data comprises a movie, and wherein the selected portion of the encoded video data comprises a favorite scene in the movie.

8. An optical disk system, comprising:
a disk drive unit for retrieving identification data, encoded
   video data, and navigation data from an optical
   disk positioned therein, wherein the identification data of the optical disk
   identifies the optical disk, and wherein the encoded video data comprises a
   presentation;
an input device configured to produce an output signal in response
   to user input, wherein the output signal indicates a
   beginning of a user selected portion of the presentation;
a memory unit having a non-volatile portion;
a microprocessor coupled to receive the identification data
  and the navigation data from the disk drive unit and the
  output signal produced by the input device, wherein the
  microprocessor is coupled to the memory unit, and
  wherein the microprocessor operates in a save index
  mode and a play index mode, and wherein when the
  microprocessor is in the save index mode, the output signal indicates the
  beginning of the user selected portion of the presentation is currently being
  played, and the micro-processor is configured to respond to the output signal
  by:
    producing the current navigation data, wherein the
      current navigation data identifies the beginning of the user selected
      portion of the presentation currently being played; and
  storing the identification data and the current navigation

UNITED STATES PATENT AND TRADEMARK OFFICE
CERTIFICATE OF CORRECTION

| | | |
|---|---|---|
| PATENT NO. | : 6,188,835 B1 | Page 3 of 5 |
| APPLICATION NO. | : 09/286177 | |
| DATED | : February 13, 2001 | |
| INVENTOR(S) | : Brett J. Grandbois | |

It is certified that error appears in the above-identified patent and that said Letters Patent is hereby corrected as shown below:

data within the non-volatile portion of the memory unit such that: (i) the identification data and the current navigation data exist in the non-volatile portion of the memory unit concurrently, and (ii) the current navigation data is associated with the identification data within the non-volatile portion of the memory unit.

9. The optical disk system as recited in claim 8, wherein when the microprocessor is in the play index mode, the microprocessor responds to the output signal by:
    retrieving the navigation data from the non-volatile portion of the memory unit; and
producing a control signal coupled to the disk drive unit which causes the disk drive unit to retrieve encoded video data corresponding to the navigation data.

10. The optical disk system as recited in claim 9, wherein the navigation data identifies the beginning of the user selected portion of the presentation.

11. A method for playing back a selected portion of a presentation recorded upon an optical disk, comprising:
    providing an optical disk system comprising:
      a disk drive unit for retrieving data stored upon an optical disk positioned therein;
      an input device for producing an output signal in response to user input; and
      a memory unit having a non-volatile portion;
    obtaining identification data from the optical disk;
    acquiring navigation data from the optical disk while the presentation is being played;
    producing the output signal via the input device when a beginning of the selected portion of the presentation is currently being played; and
    responding to the output signal by storing the identification data and the current navigation data within the non-volatile portion of the memory unit, wherein the current navigation data identifies the beginning of the selected portion of the presentation, and wherein the storing is accomplished such that: (i) the identification data and the current navigation data exist in the non-volatile portion of the memory unit concurrently, and (ii) the current navigation data is associated with the identification data within the non-volatile portion of the memory unit.

UNITED STATES PATENT AND TRADEMARK OFFICE
CERTIFICATE OF CORRECTION

| | |
|---|---|
| PATENT NO. | : 6,188,835 B1 |
| APPLICATION NO. | : 09/286177 |
| DATED | : February 13, 2001 |
| INVENTOR(S) | : Brett J. Grandbois |

It is certified that error appears in the above-identified patent and that said Letters Patent is hereby corrected as shown below:

12. The method as recited in claim 11, wherein the identification data is obtained from the optical disk when the optical disk is inserted into the disk drive unit.

13. The method as recited in claim 11, wherein the obtaining of the identification data comprises using the disk drive unit to scan the optical disk to obtain the identification data.

14. The method as recited in claim 11, wherein the acquiring is performed in response to the output signal from the input device.

15. A method for playing back a selected portion of a presentation recorded upon an optical disk, comprising:
    providing an optical disk system comprising:
      a disk drive unit for retrieving data stored upon an
        optical disk;
      an input device for producing output signals in
        response to user input; and
      a memory unit having a non-volatile portion;
    obtaining identification data from the optical disk;
    receiving navigation data from the optical disk during
      playback of the presentation;
    producing a first of the output signals via the input device when a beginning
      of the selected portion of the presentation is currently being played; and
    responding to the first output signal by:
      producing current navigation data, wherein the current
        navigation data identifies the beginning of the
        selected portion of the presentation; and
    storing the identification data and the current navigation
      data within the non-volatile portion of the
      memory unit such that: (i) the identification data and the current navigation data exist in the non-volatile portion of the memory unit concurrently, and (ii) the current navigation data is associated with the identification data within the non-volatile portion of the memory unit.

16. The method as recited in claim 15, further comprising:
producing a second of the output signals via the input device;
responding to the second output signal by:

UNITED STATES PATENT AND TRADEMARK OFFICE
CERTIFICATE OF CORRECTION

PATENT NO. : 6,188,835 B1
APPLICATION NO. : 09/286177
DATED : February 13, 2001
INVENTOR(S) : Brett J. Grandbois It is certified that error appears in the above-identified patent and that said Letters Patent is hereby corrected as shown below:

retrieving the identification data and the navigation data
      from the non-volatile portion of the memory unit; and
    initiating playback of the presentation at a playback point
      indicated by the navigation data.

17. The method as recited in claim 16, wherein the optical disk comprises encoded video data, and wherein the initiating comprises initiating retrieval of the encoded video data from the optical disk by the disk drive unit at a playback point indicated by the navigation data.

18. The method as recited in claim 16, wherein the retrieving and the initiating are accomplished following the storing.

19. The method as recited in claim 16, wherein the the second output signal occurs subsequent to the first output signal.

Signed and Sealed this

Twenty-first Day of July, 2009

JOHN DOLL
*Acting Director of the United States Patent and Trademark Office*